(No Model.)
C. P. FAY.
LEG JOINT FOR CALIPERS, DIVIDERS, &c.
No. 375,703. Patented Dec. 27, 1887.
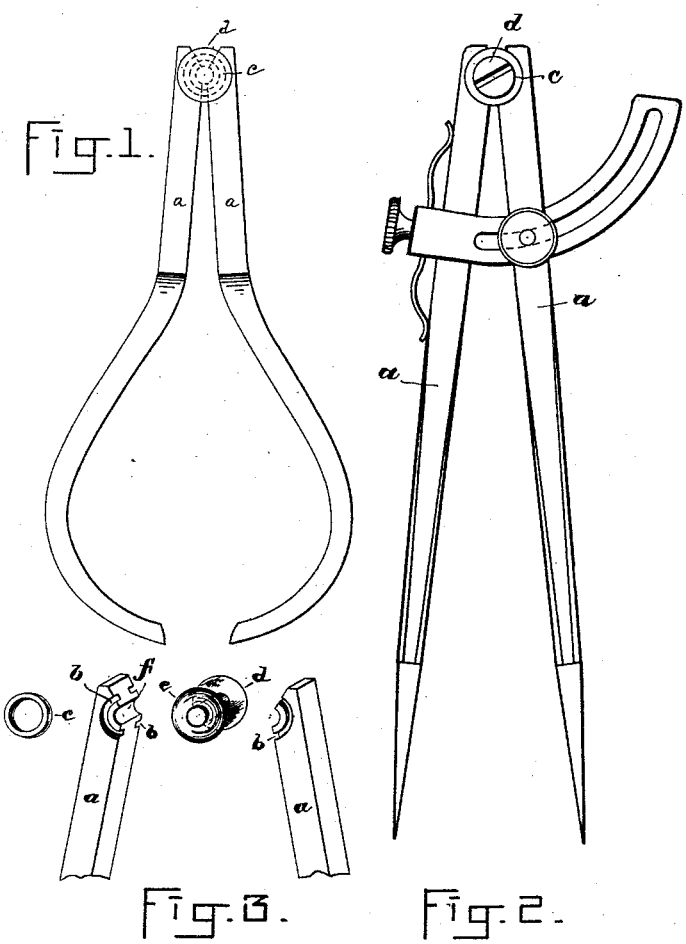

UNITED STATES PATENT OFFICE.

CHARLES P. FAY, OF ATHOL, MASSACHUSETTS, ASSIGNOR TO LAROY S. STARRETT, OF SAME PLACE.

LEG-JOINT FOR CALIPERS, DIVIDERS, &c.

SPECIFICATION forming part of Letters Patent No. 375,703, dated December 27, 1887.

Application filed October 1, 1887. Serial No. 251,179. (No model.)

*To all whom it may concern:*

Be it known that I, CHARLES P. FAY, of Athol, in the county of Worcester and State of Massachusetts, have invented a new and useful Improvement in Leg-Joints for Calipers, Dividers, &c., of which the following, taken in connection with the accompanying drawings, is a specification.

The object of this invention is to provide an improved joint for the hinged legs of calipers, dividers, &c., such joint having special adaptation to this class of instruments.

My invention consists in an instrument having one or more metal rings fitting in arc-shaped recesses formed in the legs at their connected ends, said rings, whether on one or both sides of the legs, serving the purpose of a pivot or connecting-rivet to join the legs adjustably.

In the drawings, Figure 1 is a side view of a pair of calipers, and Fig. 2 a like view of a pair of dividers embodying my invention. Fig. 3 shows details of the joint, hereinafter described.

The legs $a\ a$ are beveled or cut obliquely at their upper ends, and there formed on one side or both sides with arc-shaped grooves $b$, each constituting something less than a semicircle, as best shown in the detail view, Fig. 3. Within these grooves or recesses $b$ rings $c$, of like curvature and dimensions, are introduced and secured by any suitable means, preferably by a headed rivet, $d$, and washer $e$, Fig. 3, the stem of the rivet occupying the concavity F between the legs, while its head covers one ring and its washer the other. The rivet stem will be "upset" outside of the washer.

In place of the rivet represented in Fig. 1, a short threaded screw may be used, as in Fig. 2, to screw into a plate or nut corresponding to the washer $e$. The rings $c$ may be made independent of these parts, as in Fig. 3, or they may be formed integral with the head or washer of the bolt or screw and enter the grooves $b$ of the legs, as already described. When the rings are rectangular in cross-section and the sides of the grooves are parallel, the rings fitting closely in the grooves will retain their places indefinitely and form a serviceable joint without the central screw or rivet.

I claim as my invention—

The legs $a\ a$, having in their connected ends arc-shaped grooves $b$, in combination with the ring $c$, fitting in said grooves, and with a screw or rivet, $d$, and its nut or washer $e$, overlying such ring, substantially as and for the purpose set forth.

In testimony whereof I have signed my name to this specification, in the presence of two subscribing witnesses, on this 12th day of September, A. D. 1887.

CHARLES P. FAY.

Witnesses:
EDGAR V. WILSON,
LAROY S. SARRETT.